(12) United States Patent
Benedetto

(10) Patent No.: US 9,222,181 B2
(45) Date of Patent: Dec. 29, 2015

(54) ELECTROLYTIC CELL EQUIPPED WITH CONCENTRIC ELECTRODE PAIRS

(71) Applicant: INDUSTRIE DE NORA S.P.A., Milan (IT)

(72) Inventor: Mariachiara Benedetto, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

(21) Appl. No.: 14/405,078

(22) PCT Filed: May 16, 2013

(86) PCT No.: PCT/EP2013/060179
§ 371 (c)(1),
(2) Date: Dec. 2, 2014

(87) PCT Pub. No.: WO2013/189670
PCT Pub. Date: Dec. 27, 2013

(65) Prior Publication Data
US 2015/0144499 A1    May 28, 2015

(30) Foreign Application Priority Data

Jun. 18, 2012  (IT) .............................. MI2012A1048

(51) Int. Cl.
| C25B 9/06 | (2006.01) |
| C02F 1/461 | (2006.01) |
| C25B 1/26 | (2006.01) |
| C02F 1/467 | (2006.01) |
| C25B 3/00 | (2006.01) |
| C25C 1/00 | (2006.01) |

(52) U.S. Cl.
CPC .................. *C25B 9/06* (2013.01); *C02F 1/4672* (2013.01); *C02F 1/46104* (2013.01); *C02F 1/46109* (2013.01); *C25B 1/26* (2013.01); *C25B 3/00* (2013.01); *C25C 1/00* (2013.01); *C02F 1/4674* (2013.01); *C02F 2001/46142* (2013.01); *C02F 2001/46147* (2013.01); *C02F 2001/46152* (2013.01); *C02F 2201/4613* (2013.01); *C02F 2201/4615* (2013.01); *C02F 2201/4617* (2013.01); *Y02E 60/366* (2013.01)

(58) Field of Classification Search
CPC .............. C25B 9/06; C25B 1/26; C25B 3/00; C25C 1/00; C02F 1/46109; C02F 1/4672; C02F 1/46104; C02F 1/4674; C02F 2001/46142; C02F 2001/46152; C02F 2200/4613; C02F 2200/4615; C02F 2200/4617; Y02E 60/366
See application file for complete search history.

(56) References Cited

U.S. PATENT DOCUMENTS

| 3,990,962 | A | 11/1976 | Gotz |
| 2009/0139856 | A1 | 6/2009 | Chiarini, Jr. |
| 2009/0205971 | A1 | 8/2009 | Pentz et al. |

FOREIGN PATENT DOCUMENTS

| CA | 2542278 | 4/2005 |
| CA | 2775366 | 4/2011 |

OTHER PUBLICATIONS

International Search Report issued in PCT Application No. PCT/EP2013/060179.

*Primary Examiner* — Harry D Wilkins, III
*Assistant Examiner* — Ciel Thomas
(74) *Attorney, Agent, or Firm* — Lucas & Mercanti LLP.

(57) ABSTRACT

The invention relates to an electrochemical cell, particularly useful in electrochemical processes carried out with periodic reversal of polarity. The cell is equipped with concentric pairs of electrodes arranged in such a way that, in each stage of the process, the cathodic area is equal to the anodic area.

10 Claims, 2 Drawing Sheets

ELECTROLYTIC CELL EQUIPPED WITH CONCENTRIC ELECTRODE PAIRS

This application is a U.S. national stage of PCT/EP2013/060179 filed on May 16, 2013 which claims the benefit of priority from Italy Patent Application No. MI2012A001048 filed Jun. 18, 2012, the contents of each of which are incorporated herein by reference.

FIELD OF THE INVENTION

The invention relates to a monopolar-type electrochemical cell and to a method of carrying out electrolytic processes therein.

BACKGROUND OF THE INVENTION

The invention relates to a monopolar electrolytic cell suitable for electrochemical processes carried out with periodic reversal of the polarity. The periodic polarity reversal of electrochemical cells, whereby each of the electrodes works alternatively as anode and as cathode for preset intervals of time, is a measure known in the art especially for preventing the formation of scaling of various kind on the surface of one of the electrodes, usually the cathode. The above for example is the typical case of cells used for electrolysing diluted alkaline brines to produce active chlorine (that is, a mixture of hypochlorite and hypochlorous acid with possible traces of dissolved free chlorine and other species at equilibrium) at the anode: especially in case brine is obtained from tap water, containing carbonates and other anions of similar behaviour, the cathode becomes a site of preferential deposition of carbonates and other insoluble salts, which is favoured by process-induced alkalinisation nearby. Such deposits negatively affect current transmission by the electrode, whose electrical efficiency may degrade irreversibly in time. The periodic reversal of current direction and thus of electrode polarity makes the surface working cathodically for a half cycle to start functioning as the anode upon reversal, being subject to a local acidification which favours dissolution of the precipitate previously formed. Other electrolytic processes sometimes subject to periodic current reversal are for instance the treatment of waste waters containing organic substances, which are degraded at the anode while various kinds of deposits tend to be formed at the cathode, or cathodic deposition of metals from electrolytic baths with simultaneous anodic degradation of organics, used for treating waters in which both types of species are present as impurities. In such cases, also the anode is often subjected to the deposition of polluting films, in this case consisting of organic residues which tend to oligomerise upon the electrode surface, and which sometimes may be removed by the mechanical and chemical action of nascent hydrogen in the subsequent cathodic cycle. For the sake of preserving the regularity of operation and maintaining operative parameters of the desired process constant, the electrodes installed in the cells, destined to work alternatingly as anodes and as cathodes, besides being spaced at constant gap must preferably be of the same size, so that it is possible to keep both current supplied and operating voltage constant (except for the change of sign). This implies that the cell design for this type of processes is mainly limited to planar-type geometries, in other words contemplating the use of pairs of facing planar electrodes. However, in many cases this can constitute an undesired limitation, involving some negative consequences. In many cases in fact this kind of processes is carried out in small size units, such as the case of active chlorine production for disinfection of waters to be used in hospital, hotel or domestic field, or in the recovery of precious metals in jewellery wastes. For such kind of applications it can be important to limit volumes inasmuch as possible, selecting cell designs of coaxial concentric type, for instance cylindrical cells with outer cathode wall and central anode. This can have the advantage, besides a better exploitation of the available volume, of improving current transmission minimising edge effects, which are known to be heavier in planar geometries and very relevant in case of overall electrode areas of small size. Cells of coaxial concentric type, both cylindrical or prismatic, are characterised however by having an external electrode of bigger size than the internal one, making operation with periodic current reversal more difficult. Keeping constant in fact current intensity between one cycle and the next and thus the production of the desired species, the variation of the corresponding electrode area would entail a corresponding variation of current density and hence of process voltage; on the other hand, should one decide to operate at constant voltage, current intensity and hence production rate would oscillate between two values corresponding to the two different electrode areas, hardly in agreement with the normal requirements of an industrial process.

It was therefore identified the need for providing electrolytic cells of concentric electrode geometry, with constant interelectrode gap and with cathode area identical to the anode area.

SUMMARY OF THE INVENTION

Various aspects of the invention are set out in the accompanying claims.

Under one aspect, the invention relates to a monopolar electrolysis cell delimited by an external body housing in its interior:
  an external electrodic pair subdivided into two electrodes, separated at the edges by means of insulating elements, destined to operate alternatingly the one as the cathode and the other as the anode, and vice versa;
  an internal electrodic pair concentric thereto, so as to delimit a gap therewith of generally constant width, also subdivided into two electrodes, separated at the edges by means of insulating elements, destined to operate alternatingly the one as the cathode and the other as the anode, and vice versa, each of the two electrodes of the pair facing one of the two electrodes of the external pair;
  means of electrical connection of one of the electrodes of the external pair and of the corresponding non-facing electrode of the internal pair with one of the cell poles;
  means of electrical connection of the remaining electrodes of the two pair to the other cell pole.

In one embodiment, the external cell body has an elongated shape and the electrode pair have prismatic or cylindrical shape.

In another embodiment, the external cell body and the electrode pairs have a spheroidal shape.

In a cell constructed in such a way, both the anodic area and the cathodic area correspond to the sum of the areas of half the external electrode pair and half the internal electrode pair: by reversing the electrode polarity, the values of the anodic and of the cathodic area are unchanged.

In one embodiment, both the cell body and the electrode pairs have either a prismatic or a cylindrical shape. It can be advantageous for instance to couple a cylindrical cell body with electrode pairs also cylindrical, in order to minimise the cell volume not engaged in the electrolysis reaction. In one embodiment, the two concentric electrode pairs are coaxial to the cell body. This can also have the advantage of minimising the cell volume not engaged in the electrolysis reaction. In one embodiment, all the electrodes of the cell are made of titanium or other valve metal coated with a catalytic composition containing one or more components selected from the group of platinum such as platinum metal or oxides of platinum, ruthenium or iridium. In one embodiment, the above catalytic composition also contains oxides capable of favouring the growth of compact and protective films, for instance oxides of titanium, tantalum, niobium or tin. In the context of the present specification, the term electrode made of titanium or other valve metals is used to designate an electrode obtained starting from a substrate of titanium or other valve metal (such as for example niobium, tantalum or zirconium) either pure or differently alloyed.

In one alternative embodiment, all the electrodes of the cell are made of conductive diamond, for instance boron-doped diamond, either in massive form or supported on a suitable conductive substrate, for instance of niobium or other valve metal.

The specified materials have the advantage of working in an optimum fashion for the vast majority of known anodic applications, involving the evolution of anodic products such as chlorine, oxygen, ozone or peroxides, at the same time guaranteeing a correct functioning also as cathodes.

In one embodiment, the gap between the two electrode pairs has a generally constant width ranging between 1 and 20 mm, depending on the needs of each process, as it will be clear to a person skilled in the art.

Under another aspect, the invention relates to the method of execution of an electrolytic process comprising feeding a process electrolyte inside the gap of an electrolysis cell as hereinbefore described and supplying direct electric current to the cell poles, varying the direction of the applied current at preset time intervals, for instance every 1-120 minutes. In one embodiment, the electrolytic process according to the invention consists of the electrolysis of a salt solution with production of active chlorine. In one alternative embodiment, the electrolytic process according to the invention consists of a waste-water treatment with degradation of organic substances. In a further embodiment, the electrolytic process according to the invention consists of a metal recovery by cathodic electrodeposition, with optional simultaneous degradation of organic species.

Some implementations exemplifying the invention will now be described with reference to the attached drawings, which have the sole purpose of illustrating the reciprocal arrangement of the different elements relatively to said particular implementations of the invention; in particular, drawings are not necessarily drawn to scale.

DETAILED DESCRIPTION OF THE DRAWINGS

Figure 1:
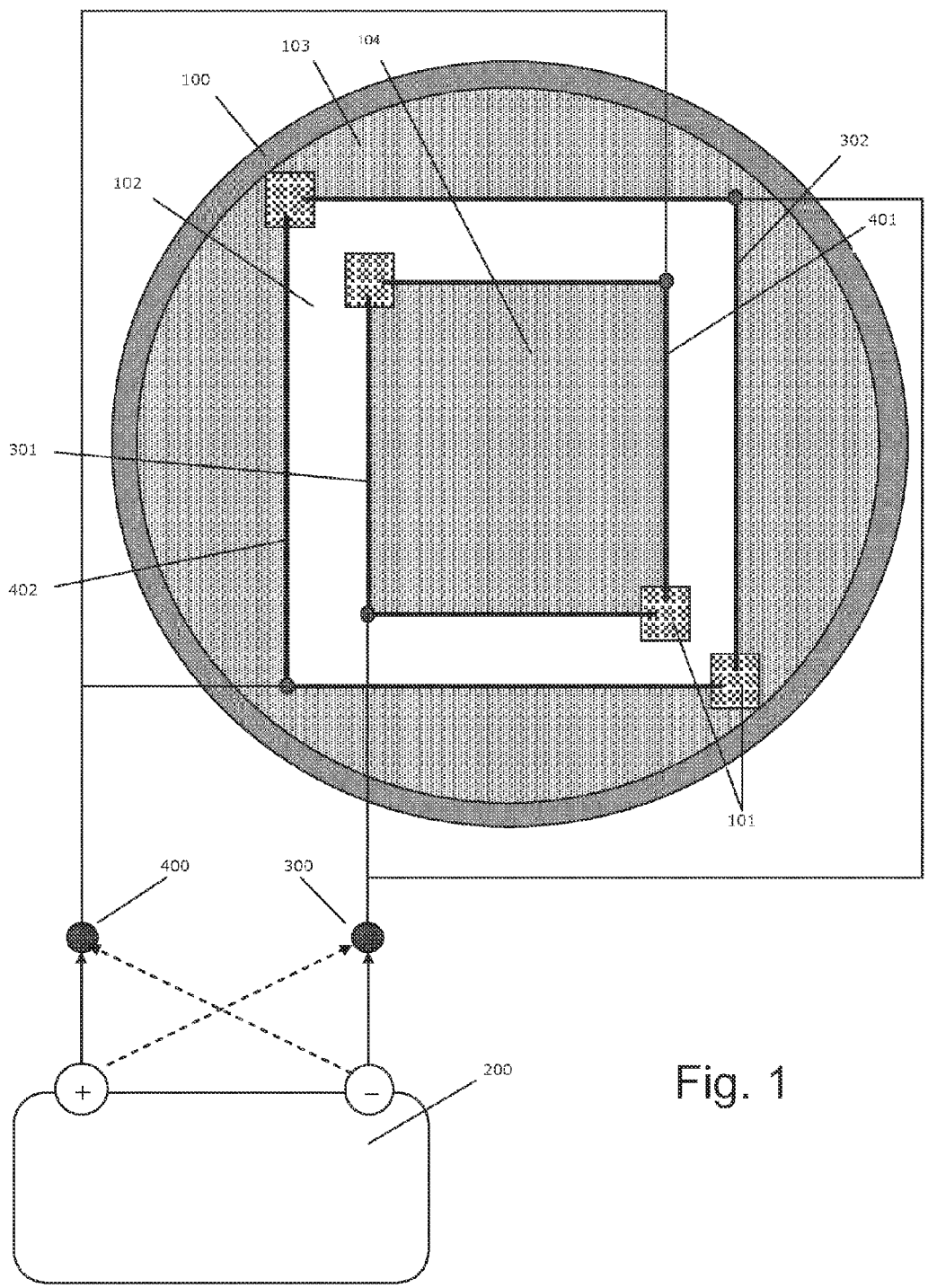
FIG. 1 shows a top-view of a section of a cell according to one embodiment of the invention comprising a cylindrical body and prism-shaped electrode pairs.

FIG. 1 shows a top-view of a section of one embodiment of the invention consisting of a cell delimited by a cylindrical body 100 in whose interior two parallelepiped-shaped electrode pairs are housed, namely an internal pair consisting of electrodes 301 and 401 separated at the edges by means of insulating elements 101 and an external pair coaxial to the internal pair consisting of electrodes 302 and 402, also separated at the edges by means of equivalent insulating elements 101. Insulating elements 101 keep the electrodes in fixed position, preventing the short-circuiting thereof: besides performing these functions, elements 101 avoid current to be concentrated at the facing edges of each electrode pair. For such reason, elements 101 must be suitably dimensioned: inventors found out that for most of tested applications, it can be advantageous to dimension elements 101 so that the distance between the facing edges of each electrode pair is at least equal to the width of gap 102. Electrodes 301 and 402 face each other, just like electrodes 302 and 401, so as to define gap 102, of generally constant width except for the corner regions. The electrode of internal pair 301 and the electrode not facing the same of external pair 302 are connected to one pole 300 of a direct power supply 200 provided with means for reversing the direction of current at preset intervals of time; similarly, the other electrode of internal pair 401 and the electrode not facing the same of external pair 402 are connected to the other pole 400 of direct power supply 200. Regions 103 and 104 of the cell body outside gap 102 are filled with insulating material, so as to confine the process electrolyte inside gap 102 which constitutes the zone of reaction. The cell can be fed from a terminal part of cylindrical body 100 with the outlet on the opposite site and can optionally operate in continuous mode, with a single pass of electrolyte, or in batch mode.

Figure 2:
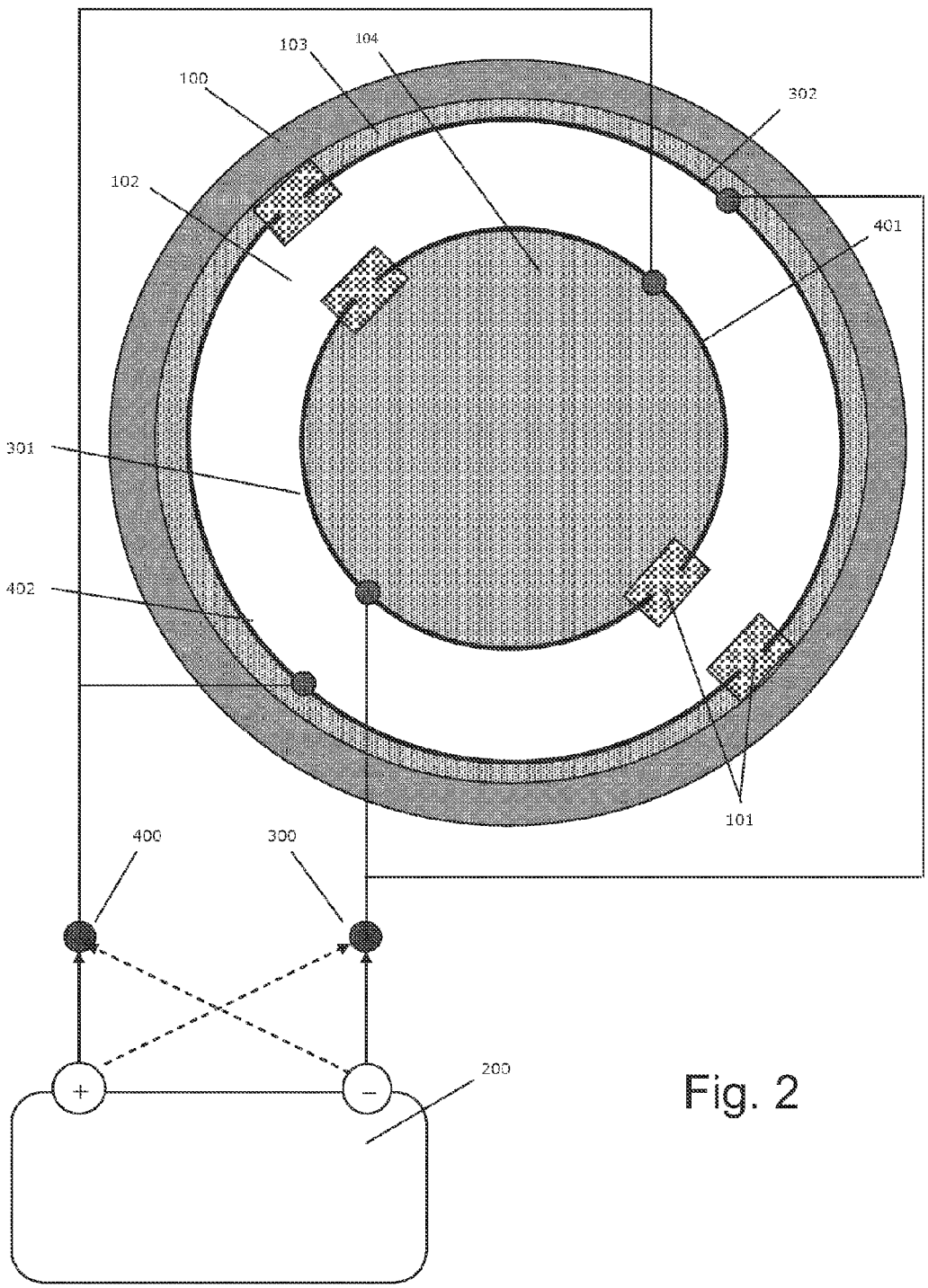
FIG. 2 shows a top-view of a section of a cell according to one embodiment of the invention comprising a cylindrical body and cylinder-shaped electrode pairs.

FIG. 2 shows a top-view of a section of a similar embodiment of the invention, differing from the previous one in the cylindrical shape of electrode pairs. This has the advantage of keeping the width of gap 102 constant, eliminating the corner regions besides maximising the ratio of active electrode surface to total cell volume.

Some of the most significant results obtained by the inventors are illustrated in the following example, which is not intended to limit the extent of the invention.

EXAMPLE

A brine prepared from tap water containing 9 g/l of NaCl was fed to gap 102 of a cell corresponding to the embodiment of FIG. 1, equipped with an external electrode pair of 15 cm$^2$ and an internal electrode pair of 7 cm$^2$ total surface. The overall height of both electrode pairs was 5 cm. The electrodes of the two pairs consisted of a titanium sheet activated on the gap-facing side with a mixture of oxides of ruthenium, palladium and titanium as known in the art. The total volume of reaction, corresponding to the volume of the gap, was 55 ml. By applying a total current of 2 A, corresponding to current densities of 1.5 kA/m$^2$ on the internal electrode pair and 0.7 kA/m$^2$ on the external one, and by reversing the direction of the current every 180 seconds, it was possible to produce 3300 ppm of active chlorine with a constant yield of 48% in the course of a series of batch cycles of 15 minutes each, observing a pH increase from initial neutrality up to a value of 11.3.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Monopolar electrolysis cell delimited by an external body of elongated or spheroidal shape with an external electrodic pair and an internal electrodic pair arranged in its interior, said external electrodic pair subdivided into a first external electrode and a second external electrode of equal dimensions separated at the edges by means of first insulating elements, said internal electrodic pair subdivided into a first internal electrode and a second internal electrode of equal dimensions separated at the edges by means of second insulating elements, said internal and external electrodic pairs arranged concentrically with the surfaces of said first external electrode and said first internal electrode and the surfaces of said second external electrode and said second internal electrode facing each other so as to delimit a gap, said first external electrode and said second internal electrode being connected to one pole of the cell, said second external electrode and said first internal electrode being connected to the opposite pole of the cell.

2. The cell according to claim 1 wherein said internal and external electrodic pairs are electrodic pairs of cylindrical or prismatic shape housed in the interior of the body of elongated shape or electrodic pairs of spheroidal shape housed in the interior of the body of spheroidal shape.

3. The cell according to claim 2 wherein said external electrodic pair and said internal electrodic pair are coaxial to the cell external body.

4. The cell according to claim 1 wherein said first and second external electrodes and said first and second internal electrodes are made of conductive diamond in massive or supported form or of titanium coated with a catalytic composition containing one or more elements of the group of platinum.

5. The cell according to claim 4 wherein said catalytic composition contains at least one component selected between metallic platinum, platinum oxide, ruthenium oxide and iridium oxide and at least one oxide of an element selected between titanium, tantalum, niobium and tin.

6. The cell according to claim 1 wherein said gap has a constant width ranging from 1 to 20 mm.

7. The cell according to claim 1 wherein said first and second insulating elements are dimensioned so that the distance between the facing edges of said first external electrode and said second external electrode, and the distance between the facing edges of said first internal electrode and said second internal electrode are at least equal to the width of said gap.

8. Method of execution of an electrolytic process in a cell according to claim 1 comprising feeding a process electrolyte inside said gap and supplying direct electric current to the cell poles, varying the direction of said direct current at preset time intervals.

9. The method according to claim 8 wherein said electrolytic process is selected from the group consisting of electrolysis of salt solutions with production of active chlorine, degradation of organic substances by electrolysis of wastewaters and recovery of metals by cathodic electrodeposition, with optional simultaneous degradation of organic species.

10. The method according to claim 8 wherein said preset time intervals have a duration of 1 to 120 minutes.

* * * * *